United States Patent
Eloo et al.

(10) Patent No.: US 8,414,283 B2
(45) Date of Patent: Apr. 9, 2013

(54) METHOD AND DEVICE FOR GRANULATING PLASTICS AND/OR POLYMERS

(75) Inventors: Michael Eloo, Xanten (DE); Juergen Heinz Veltel, Kevelaer (DE)

(73) Assignee: Gala Industries, Inc, Eagle Rock, VA (US)

( * ) Notice: Subject to any disclaimer, the term of this patent is extended or adjusted under 35 U.S.C. 154(b) by 0 days.

(21) Appl. No.: 13/457,264

(22) Filed: Apr. 26, 2012

(65) Prior Publication Data

US 2012/0267818 A1  Oct. 25, 2012

Related U.S. Application Data

(63) Continuation of application No. 11/884,462, filed as application No. PCT/EP2006/001363 on Feb. 15, 2006, now Pat. No. 8,187,512.

(30) Foreign Application Priority Data

Feb. 16, 2005  (DE) .......................... 10 2005 007 102

(51) Int. Cl.
*A01J 25/02* (2006.01)
*B29B 9/06* (2006.01)
*B29C 47/00* (2006.01)

(52) U.S. Cl. ........ 425/313; 264/141; 425/308; 425/310; 425/311

(58) Field of Classification Search .................. 425/313, 425/308, 310, 311; 264/141
See application file for complete search history.

(56) References Cited

U.S. PATENT DOCUMENTS

| 3,867,082 A | * | 2/1975 | Lambertus ..................... 425/313 |
| 5,879,720 A | * | 3/1999 | Yoshida et al. ................ 425/183 |
| 7,011,112 B2 | * | 3/2006 | Chszaniecki ................. 137/876 |

FOREIGN PATENT DOCUMENTS

DE  10234228  *  2/2004

* cited by examiner

*Primary Examiner* — Yogendra Gupta
*Assistant Examiner* — Jeremiah Smith
(74) *Attorney, Agent, or Firm* — Jacobson Holman PLLC

(57) ABSTRACT

A method and apparatus for the pelletization of plastics and/or polymers, in which a melt coming from a melt generator is supplied via a diverter valve having different operating positions to a plurality of pelletizing heads through which the melt is pelletized. The plurality of pelletizing heads have different throughput capacities and are used sequentially for the start-up of the pelletizing process, with the melt first being supplied to a first pelletizing head having a smaller throughput capacity and then the melt volume flow being increased and the diverter valve being switched over such that the melt is diverted by the diverter valve to a second pelletizing head having a larger throughput capacity.

22 Claims, 10 Drawing Sheets

SECTIONAL REPRESENTATION C-C

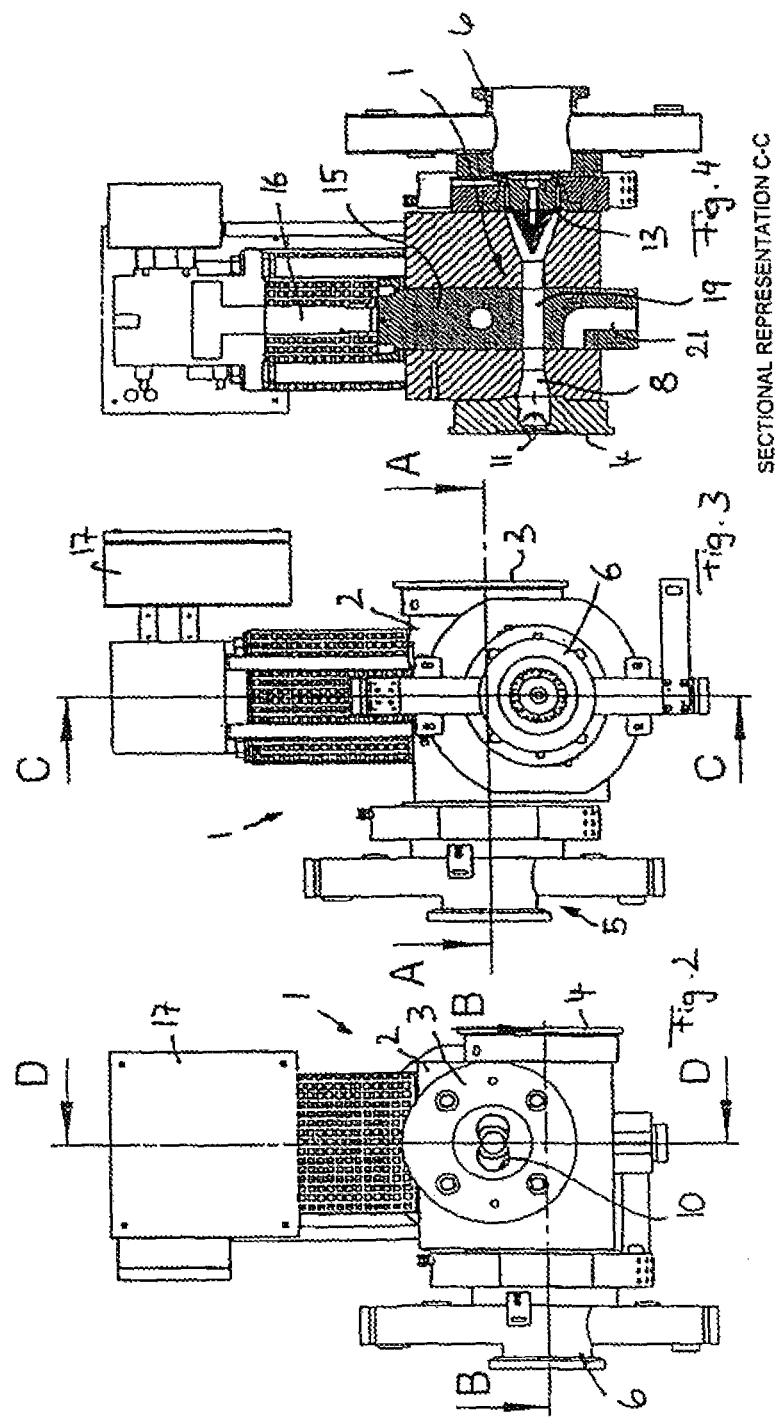

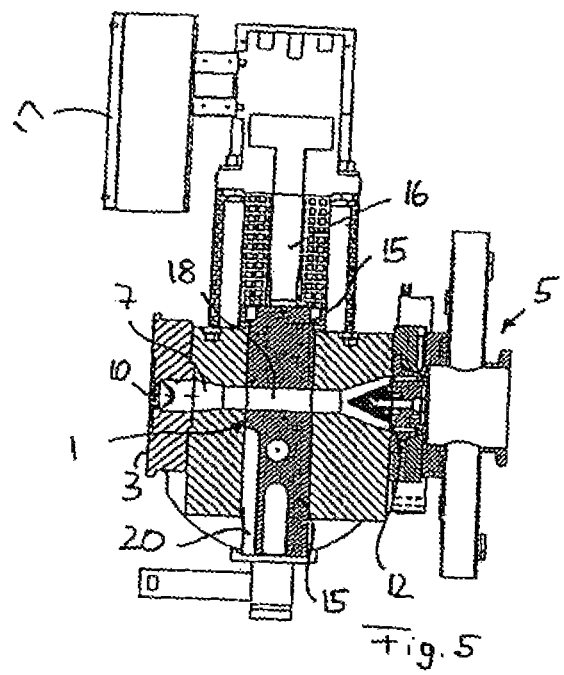
Fig. 5
SECTIONAL REPRESENTATION D-D
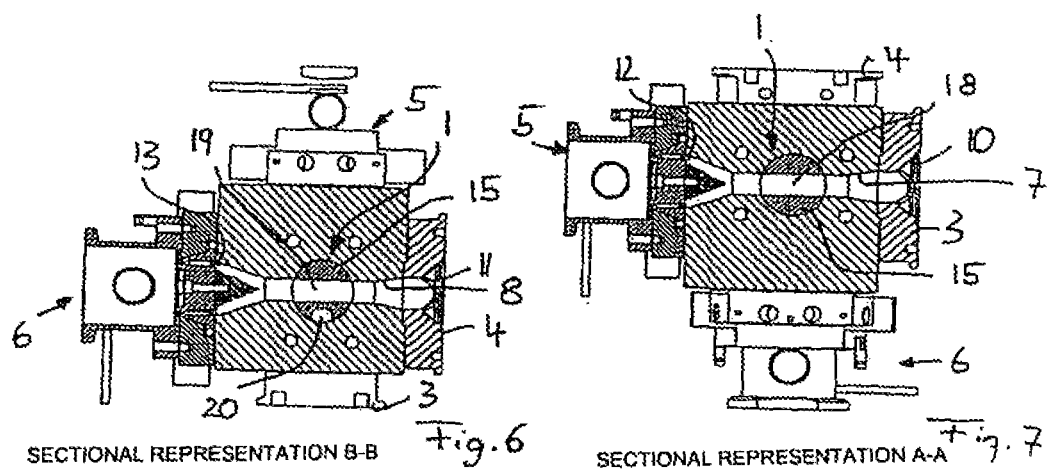
Fig. 6  SECTIONAL REPRESENTATION B-B
Fig. 7  SECTIONAL REPRESENTATION A-A

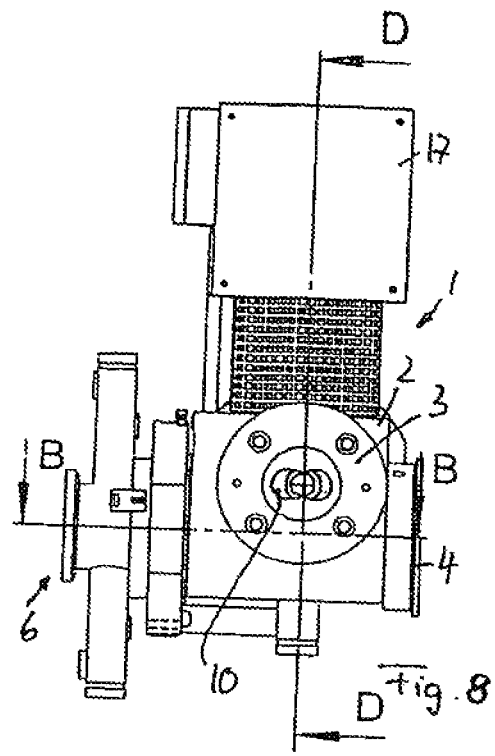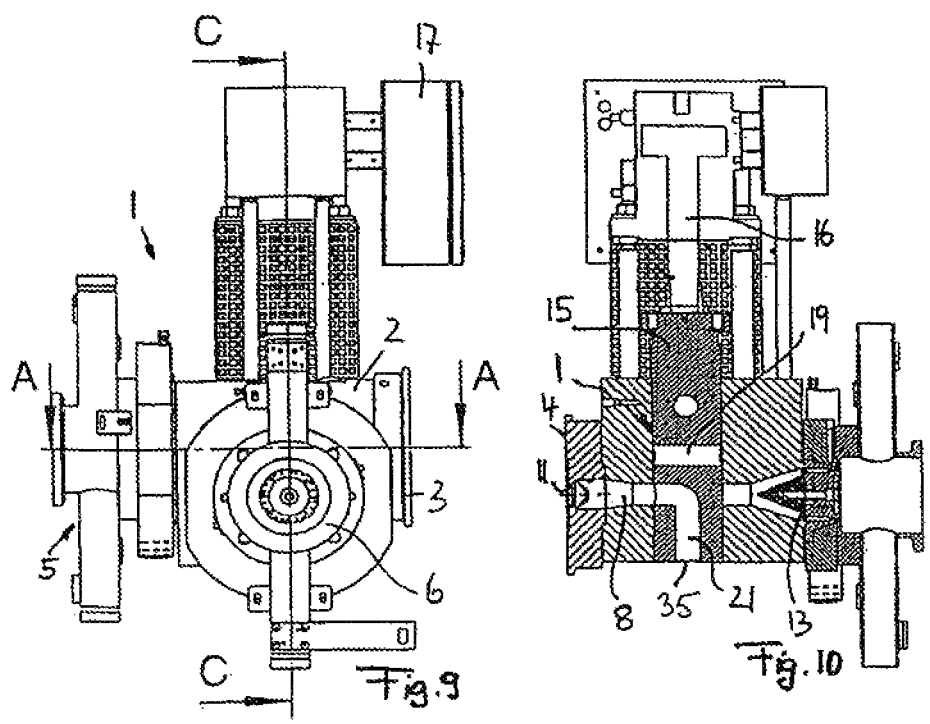
SECTIONAL REPRESENTATION C-C

SECTIONAL REPRESENTATION D-D

SECTIONAL REPRESENTATION B-B

SECTIONAL REPRESENTATION A-A

SECTIONAL REPRESENTATION A-A

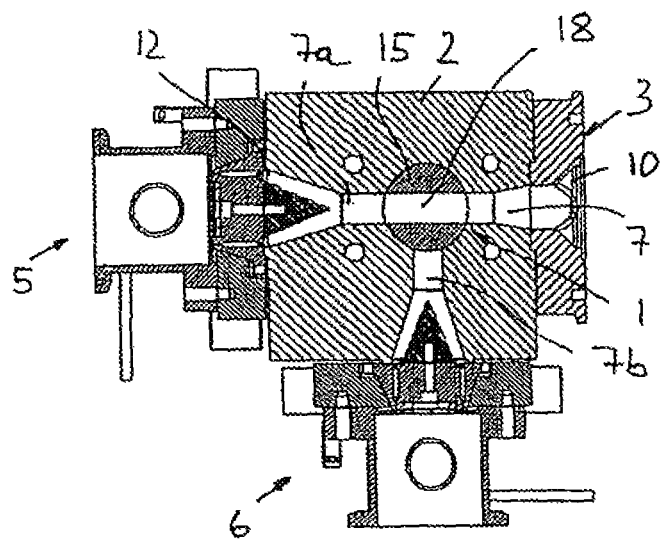
Fig. 16
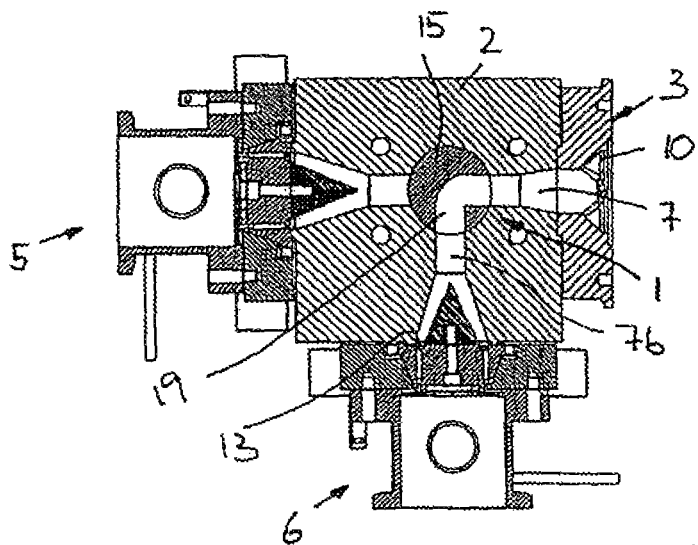
SECTIONAL REPRESENTATION C-C      Fig. 17

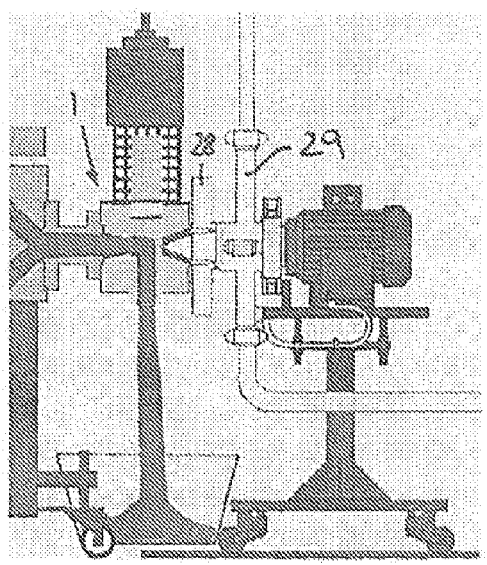 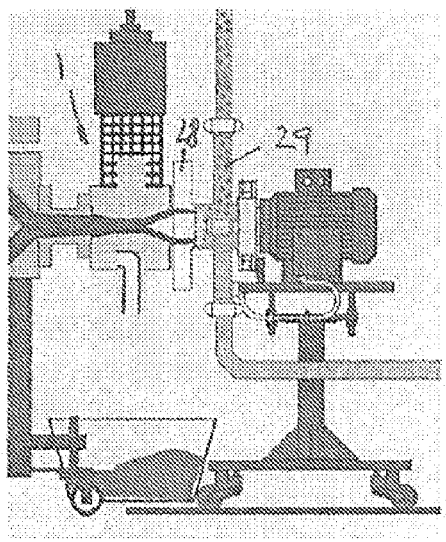
a)   b)
Fig. 19

METHOD AND DEVICE FOR GRANULATING PLASTICS AND/OR POLYMERS

This is a continuation application of U.S. application Ser. No. 11/884,462, filed Jul. 23, 2008, now U.S. Pat. No. 8,187,512 which is a nationalization of PCT/EP06/001363 filed Feb. 15, 2006, which claimed priority from DE 102005007102.3 filed Feb. 16, 2005, the priority of which is hereby claimed.

BACKGROUND OF THE INVENTION

1. Field of the Invention

The present invention relates to a method for the pelletization of plastics and/or polymers, wherein a melt coming from a melt generator is supplied via a diverter valve having different operating positions to a plurality of pelletizing heads through which the melt is pelletized. The invention furthermore relates to a pelletizing apparatus for the pelletization of plastics and/or polymers having a diverter valve which has at least one melt generator connection, at least two pelletizer connections as well as a switching gate for selectively connecting the melt generator connection to at least one of the pelletizer connections, with a respective pelletizing head being connected to the at least two pelletizer connections and a melt generator having a variable melt volume flow being connected to the melt generator connection. Finally, the invention also relates to a diverter valve for such a pelletizing apparatus having a melt generator connection, a pelletizer connection as well as a melt passage for the connection of the melt generator connection to the pelletizer connection.

2. Description of the Related Art

As a rule, diverter valves via which the pelletizer is connected to the melt generator are used for the start-up of pelletizer devices. This in particular applies to complex production processes whose start-up procedure is difficult as well as to applications in which uniform pellets should be generated as rapidly as possible. Diverter valves of this type are described, for example, in DE 102 34228 A1; DE 38 15 897 C2 or EP 0 698 461 81. These diverter valves comprise, in the melt passage which connects the inlet opening of the valve at the melt generator connection to the outlet opening at the pelletizer connection, a diverter gate which interconnects the connection of the melt generator connection to the pelletizer connection in the production position, whereas it keeps the melt flow away from the outlet opening at the pelletizer connection in its start-up position, i.e. it blocks it and diverts the melt loss so that the melt flow entering at the melt generator connection does not move to the pelletizer connection, but instead exits at a bypass opening of the valve and as a rule simply flows onto the floor. If the pelletizer device has started up so that all the units are working with the desired operating parameters and the melt flow has reached the desired quality, the diverter gate is switched over to its production position so that the melt flow in the diverter valve. flows to its pelletizer connection and is then processed to pellets by the pelletizer connected there.

The start-up phase of a production process can admittedly be effected per se in a satisfactory manner using such known diverter valves; however, problems occur on the changing from one production. process to a second production process, for example on a change of the polymer/filler mixture, on a change of the pellet geometry, on a changeover to changed throughput demands, on a change in the color of the pellets or also on scheduled or unscheduled production interruptions e.g. for repairs to the nozzle plate. The problem which results in this process is that the total diverter valve, including the melt passage in the interior of the valve, has to be cleaned completely before the plant can be started up again. Without such a cleaning, contaminations of long duration would occur, for example on the changeover from colored pellets to white pellets. Conventional diverter valves have to be dismantled for cleaning as a rule, whereby the production process is interrupted for a longer duration. Moreover, subsequent to the cleaning, the fitting time has to be taken into account which is needed, for example, for the heating of the diverter gate to operating temperature.

The possible alternative of having two separate diverter valves available for such changes between two production processes is not acceptable for a number of operators of such plant. On the one hand, the costs for two complete diverter valves are incurred. Apart from this, time delays also occur on the use of two separate diverter valves, e.g. due to the ramping up of the new diverter valve to operating temperature.

Furthermore, DE 696 21 101 T2 describes the possibility of viscosity change within a compounding process with subsequent pelletization in a corresponding large-production plant having a performance of at least 1000 kg/h. Two pelletizer heads are connected to the valve connected downstream of the melt generator so that highly viscous material can be given to the one pelletizing head and low viscosity material can be given to the other pelletizing head by switching over the valve. The problems of the start-up losses are, however, not solved in this process; it is rather the case that material not yet pelletizable should be discharged via a bypass opening in a manner known per se up to the reaching of the respective operating point. Furthermore, a pelletizing apparatus is described in DE 197 54 863 C2 in which two pelletizing heads are connected to a three-way valve so that, on a color change from black material to white material or vice versa, the one or the other pelletizing head can selectively be selected. To so-to-say flush out color contaminations on a color change in this process, a central bypass outlet is provided in the valve via which material of the new color is discharged for so long after a change of color in the melt generator until even the last contaminants have been taken along. This is more counterproductive than helpful with respect to the aforesaid objective of reducing start-up losses and of decreasing expensive material waste. Finally, a multiway rotary valve for pelletizing plant is known from DE 100 30 584 with whose help its high molecular plastic melts can be distributed or split up. The problems of the start-up losses are, however, also not addressed in this reference.

With a customary design of an underwater pelletizing plant, the start-up losses which occur and the corresponding material loss are definitely cost intensive. In particular with polymers or plastics sensitive to freezing, e.g. products with a high crystallite melting point, it is necessary to start and to operate at a minimal throughput of more than 10 kg/h per nozzle bore. After the actual starting process, the subsequent throughput increase is unproblematic as a rule. However, material losses arise due to the starting process itself due to start-up product in block form on the floor which can easily amount to several kilograms. This is not only uneconomical because the expensive raw materials are transferred in a non-sellable form, but is also unpleasant for the operator of a corresponding production plant since the blocks can turn out relatively large and have to be reduced to small particles in an expensive process and finally have to be disposed of. Such a hot melting block having temperatures of, optionally, more than 250° C., and discharged via the bypass outlet of the diverter valve not least also represents a potential safety risk. The problems of the discharge of plastic melt via the bypass outlet does not only occur in the actual start-up of a corresponding production plant for a new production job, but also when, for whatever different reasons, the plant has to be operated out of the throughput window of the pelletizing head, in particular when the melt volume flow has to be operated below the lower capacity limit of the respective pelletizer head. Here, too, the diverter valve sometimes has to be switched into the bypass position so that corresponding material waste arises.

SUMMARY OF THE INVENTION

It is therefore the underlying object of the present invention to provide an improved pelletizing method as well as a diverter valve of the named kind which avoids disadvantages of the prior art and further develops it in an advantageous manner. Preferably, a ramping up of the pelletizing should be achieved with start-up losses which are as low as possible and also an operation should be achieved which is as continuous as possible without intermediate interruptions of the process and restartup losses.

This object is solved in accordance with the invention by a method of pelletizing plastics and/or polymers, wherein a melt coming from a melt generator is supplied via a diverter valve having different operating positions to a plurality of pelletizing heads through which the melt is pelletized. According to the method, the pelletizing heads have different throughput capacities and are used sequentially for the start-up of the pelletizing process. The melt is first supplied to a first pelletizing head having a smaller throughput capacity and then the melt volume flow is increased, the diverter valve is switched over and the melt is diverted by the diverter valve to the second pelletizing head having a larger throughput capacity.

The present invention also includes an apparatus for the pelletizing of plastics and/or polymers comprising a diverter valve having at least one melt generator connection, at least two pelletizer connections as well as a switching gate for the connection of the melt generator connection selectively to at least one of the pelletizer connections. A respective pelletizing head is connected to the at least two pelletizer connections and a melt generator having a variable melt volume flow is connected to the melt generator connection. The apparatus includes at least two pelletizing heads having different throughput capacities and a control apparatus is provided for the switchover of the connection of the melt generator connection of the diverter valve from one of the pelletizing heads to another of the pelletizing heads in dependence on the melt volume flow of the melt generator.

Finally, the present invention also includes a diverter valve for a pelletizing apparatus comprising a first melt generator connection, a first pelletizer connection and a first melt passage for the connection of the melt generator connection to the pelletizer connection; a second pelletizer connection, a second melt generator connection as well as a second melt passage for the connection of the second melt generator connection to the second pelletizer connection; as well as a valve body for the control of the passage of at least one melt passage. The two melt passages are configured separately from one another and are free of overlap. In addition, the valve body is in a valve recess which is in communication with both melt passages and with a bypass valve that can be moved back and forth between a first operating position in which the first melt generator connection is switched through to the first pelletizer connection and the second melt generator connection is switched through to the second pelletizer connection, and a second_operating position in which the first melt generator connection and/or the second melt generator connection is/are switched through to the bypass passage.

The present invention therefore starts from the idea of using a plurality of pelletizing heads with different passage capacities and of hereby enlarging the throughput windows to be able to work largely continuously without intermediate interruptions and to shorten unavoidable start-up processes by switching in pelletizing heads having small throughput capacities or to minimize them with respect to the start-up products which occur. In accordance with an aspect of the present invention, a plurality of pelletizing heads having different throughput capacities are used sequentially for the start-up of the pelletizing process, with the melt first being supplied to a first pelletizing head having a smaller throughput capacity and then the melt volume flow being increased and the diverter valve being switched over such that the melt is diverted by the diverter valve to a second pelletizing head having a larger throughput capacity. The time and thus the amount of the start-up product until the melt generator reaches the lower throughput limit of the pelletizing head and the pelletizing process can be started are cut by the use of initially one pelletizing head having a throughput capacity which is as low as possible. No further start-up product is incurred from the start onwards of the pelletizing process at the lower throughput limit of the said first pelletizing head. The melt volume flow is increased quantitatively for s6 long until the diverter valve can be switched to the second pelletizing head having the larger throughput capacity with no start-up product being incurred during this time period. Moreover, the throughput window is enlarged in total so that the number of unavoidable start-up procedures with startup product arising therein is reduced since it is possible, on a ramping down of the melting performance below the lower throughput limit of the larger pelletizing head which may become necessary for various reasons, to switch back to the first pelletizing head.

In a technical apparatus respect, it is proposed in accordance with an aspect of the present invention that the pelletizing apparatus of the initially named kind has a control apparatus for the control of the switching gate of the diverter valve in dependence on the melt volume flow of the melt generator. The diverter valve can be switched to the pelletizing head having the smaller passage capacity with a small melt volume flow by means of this control apparatus, whereas the diverter valve is switched to the second pelletizing head having the larger throughput capacity with a larger melt volume flow. A considerable increase in efficiency can already be achieved by such a control apparatus, independently of the aforesaid start-up process, in that the throughput window of the apparatus is enlarged and it is possible to work over a larger operating range without interruptions so that fewer start-up processes become necessary. In this connection, the control apparatus can generally realize different degrees of automation, for example, be configured semiautomatically such that it emits an indication on the reaching of a melt volume flow which permits an operation of the second pelletizing head having the larger throughput capacity, said indication drawing the attention of a plant operator thereto and such that, after a corresponding input by the plant operator, the diverter valve then switching in the aforesaid manner to the second pelletizing head having the larger throughput capacity so that the melt flow is diverted from the first pelletizing head to the second pelletizing head. The control apparatus can also be configured to be fully automatic in a particularly advantageous manner such that it automatically switches the diverter valve to the respectively matching pelletizing head on the determination of a corresponding melt volume flow.

In a further development of the invention, the control apparatus can in particular have control means which switch the diverter valve to the first pelletizing head having a smaller throughput capacity when the melt volume flow is below a lower capacity limit of the second pelletizing head having a larger throughput capacity, but above a lower capacity limit of the first pelletizing head and which switch the diverter valve to the second pelletizing head when the melt volume flow is above the lower capacity limit of the second pelletizing limit and still below a lower capacity limit of an optionally present third pelletizing head having an even larger throughput capacity.

The control apparatus can advantageously also have volume flow control means for the control of the volume flow which is directed into the diverter valve by the melt generator. Generally, in this process, different melt generators or melt producers with variable volume flow can be used; for example, the melt flow can then be generated via a corresponding screw extruder and simultaneously be varied with respect to its volume. Optionally, however, a gear pump can also be interposed between the melt generator and the diverter valve to control the volume flow accordingly. To be able to adapt the process in as variable a manner as possible to different conditions, the control apparatus is advantageously configured such that it can vary, preferably continuously vary, the volume flow, also within the capacity limits of a pelletizing head.

The melt volume flow can in particular be continuously increased within the throughput capacity limits of the first pelletizing head on the start-up of the pelletizing process on the pelletizing with the first pelletizing head having a smaller throughput capacity, i.e. still before the switching over of the diverter valve to the second pelletizing head. Since pelletizing is already taking place with the first pelletizing head, no start-up product is incurred, with the plant being moved continuously to the pelletizing process having the second, larger pelletizing head due to the increase of the melt volume flow.

The diverter valve is advantageously only switched over to the second pelletizer head when the melt volume flow has been increased up to the lower capacity limit of the second pelletizing head and/or the upper capacity limit of the first pelletizing head.

Generally, the diverter valve can be switched to the first pelletizing head on the start-up of the pelletizing plant from its bypass position in which start-up product is directed to the floor or to a suitable storage container when the minimal conditions for a successful start have been reached. The diverter valve can in particular be switched from the start-up position to the first pelletizing head in a further development of the invention in dependence on the melt viscosity, on the mass temperature, on the mass pressure, the degassing state and/or the reaching of the required minimal volume flow. Corresponding means for the determination can advantageously be provided in a technical apparatus respect, preferably sensors for the detection of the said parameters, so that the control apparatus can switch the diverter valve accordingly in dependence on the corresponding signals. Instead of corresponding sensors, the said parameters can also be estimated. In addition to the said parameters, even further parameters such as the color, filler induction or further melt parameters or pelletizing parameters can be taken into account for the switching over of the diverter valve to the first pelletizing head.

In a similar manner, the switching over of the diverter valve from the first pelletizing head to the second pelletizing head or from the nth pelletizing head to the n+1th pelletizing head can also take place not only in dependence on the reaching of the required minimal volume flow for the second or n+1th pelletizing head, but alternatively or additionally thereto in dependence on further parameters. The diverter valve can in particular be switched from the first pelletizing head to the second pelletizing head in dependence on the pellet size, the melt mass pressure, the mass temperature of the melt or further parameters such as the pellet shape, surface tackiness, agglomeration, occurrence of double grains, crystallization effects, etc. If, for example, no further upward latitude is given on the reaching of the maximally possible pelletizer speed in the first pelletizing head, so that the correct pellet size can only be maintained or can only be reached again by switching over to the next pelletizer, the diverter valve can be switched over to the larger pelletizing head. Alternatively or additionally, this switchover can be carried out when the mass pressure of the melt rises above a corresponding limit value. When throughput performances are increased, the head pressure usually also increases, which can be restrictive with some products since damage due to shearing based on the pressure can occur. As a consequence thereof, the mass temperature of the melt can also increase too pronouncedly, whereby similar consequences occur. A switchover can also be a remedy here. When the pellet shape is taken into account, a critical deformation of the pellets which arises on the increase of the volume flow per bore can e.g. be used as the criterion. A switchover to the larger pelletizing head can also help here in dependence on the sensitivity of the material produced and on the demands on the pellet quality. Other secondary switchover necessities can moreover be derived from the pellet size which are, however, ultimately correlated with the grain size of the pellets, namely the surface tackiness, the agglomeration, double-grain, different crystallization effects based on a different size and temperature of the pellets and the like.

To achieve a throughput window, and thus operating window, which is as wide as possible with as few pelletizing heads as possible, but simultaneously to ensure a switchover of the melt processing which is as free of problems as possible from the one pelletizing head to the other pelletizing head, the pelletizing heads connected to the diverter valve have mutually complementary throughput capacity ranges, preferably throughput capacity ranges seamlessly adjoining one another. Optionally, the capacity ranges could also overlap, with it, however, nevertheless applying overall for the increase of the throughput window that the throughput capacity region defined by both pelletizing heads is larger than that of only one pelletizing head, A maximal utilization of each capacity range can be achieved by a configuration of the pelletizing heads such that their capacity ranges seamlessly adjoin one another. For example, when the pelletizing apparatus is configured for the pelletizing for PET, a first pelletizing head having a throughput performance span from 2500 kg/h up to 4500 kg/h, a second pelletizing head having a throughput capacity of 4500 kg/h up to 7500 kg/h and a third pelletizing head having a throughput capacity of 7500 kg/h up to 12,500 kg/h can be used. It is understood that the capacity limits can be selected differently, with them advantageously seamlessly complementing one another in a corresponding manner, however.

Generally, the pelletizing heads can be configured for different extrusion pelletizing processes. In accordance with an advantageous embodiment of the invention, the pelletizing heads can form underwater pelletizing heads. Alternatively, the pelletizing heads can also form hot face pelletizing heads or water ring pelletizing heads.

In an advantageous further development of the invention, all the pelletizing heads are of the same type, for example underwater pelletizing heads.

In an alternative configuration of the invention, however, the pelletizing heads can also realize different pelletizing types; for example, the pelletizing head having a smaller throughput capacity can be an underwater pelletizing head, whereas the pelletizing head having a larger throughput performance is an extrusion pelletizing head.

The diverter valve is advantageously configured such that a diversion of the melt flow from one pelletizing head to the next pelletizing head is made possible which is as rapid and as free of interruption as possible.

A multidirectionally operable diverter valve such as, for example, the bidirectionally operable diverter valve for different process stages, preferably has different flow paths for the melt so that the diverter valve for a first process stage can be operated with a first flow path and can selectively be operated for a second process stage via a second flow path. It can selectively output the melt via a first or a second pelletizer connection. The respective other, not operated, flow path or pelletizer connection can simultaneously be cleaned for production via the flow path in operation so that down times occurring hereby are omitted. The flow path or pelletizer connection not in operation nevertheless remains at temperature since the heat introduced by the melt naturally also heats up the non-operated part of the diverter valve.

In accordance with an advantageous embodiment of the present invention, the diverter valve can largely realize the plurality of production paths starting from only one melt generator connection. In accordance with this embodiment of the invention, the diverter valve has, in addition to the first pelletizer connection, a second pelletizer connection which can be connected to the same melt generator connection, or melt producer connection as the first pelletizer connection. To be able to allow the melt flow to be discharged selectively via the first pelletizer connection or the second pelletizer connection, the diverter valve has a valve gate which connects the melt generator connection to the first pelletizer connection in a first production position and connects the said melt generator connection to the second pelletizer connection in a second production position.

The polymer melt can hereby quickly be diverted to one of the two nozzle geometries installed at the pelletizer connections. The respective other nozzle geometry is so-to-say in stand-by and is not used. A switchover between the two possible production devices can be carried out in seconds by actuation of the valve gate.

In a further development of the invention, a valve gate can be provided in the melt passage selectively connecting the melt producer connection to one of the two pelletizer connections, said valve gate switching the melt passage through to the respective pelletizer connection in its production position, whereas it diverts the melt flow in its start-up position and gives it to a bypass opening.

The valve gate may include separate components for the switchover between the production directions and the diversion to the bypass opening for the start-up process. In a further development of the invention, however, the switchover and diversion components are coupled to one another, are in particular formed by a common valve body and are actuable by a common valve actuator.

In a further development of the invention, the diverter valve can also have a third or a further pelletizer connection, which can be connected to the melt passage, in addition to the first and second pelletizer connections. In this connection, the valve gate is preferably configured such that it connects the third pelletizer connection to the melt generator connection in a third production position. Accordingly, the diverter valve can even switch over between more than two production directions.

In accordance with an aspect of the present invention, the diverter valve has a second production path made completely separate from the first production path. In addition to the first melt generator connection, to the first pelletizer connection and to the first melt passage for the connection of the said first melt generator connection and the pelletizer connection, the valve in accordance with this embodiment has a second pelletizer connection as well as a second melt generator connection which can be connected to one another by a second melt passage. In this option, the change from a first production process to a second production process can advantageously take place particularly fast in that the initially used melt connection and pelletizer connection are released by means of quick-closing couplings and the diverter valve with the second melt connection and pelletizer connection and corresponding quick-couplings is again installed between the melt generator and the pelletizer after a minimal mechanical conversion and a corresponding rotation of the diverter valve itself. The second melt passage is in the cleaned state, on the one hand, and is already pre-heated by the preceding production process, on the other hand, so that the new production process can be started quickly.

In this connection, a valve gate is provided in the said first melt passage and in the said second melt passage and switches through the respective melt passage in a production position so that the melt flow can flow from the inlet opening of the respective melt generator connection to the outlet opening of the associated pelletizer connection and diverts the melt flow in a start-up position, i.e. blocks the respective pelletizer connection and directs the melt flow to a bypass opening so that the start-up procedure can take place in a manner known per se for the new production process.

In this connection, the valve gate of the first melt passage and the valve gate of the second melt passage are advantageously realized in a common valve member and can be actuated by a common valve actuator. Only a control mimicry is hereby required for the switchover from the start-up position to the production position of both production paths. The corresponding components such as the valve actuator, the control electronics, etc. can be dispensed with respect to the use of two separate diverter valves so that this solution is characterized by its cost efficiency.

Switch-through passages both for the first melt passage and for the second melt passage and corresponding bypass passages are provided in the valve member for the diversion of the melt flow of the first melt passage and of the melt flow of the second melt passage to a bypass opening in each case.

The valve gates formed by the valve member are advantageously configured such that both valve gates are simultaneously in their production position and simultaneously in their start-up position. When both production paths of the diverter valve are used simultaneously, the corresponding production processes can hereby be started up simultaneously. If only one of the two production paths of the diverter valve is used, the non-used production path is open in a throughgoing manner so that it can be cleaned completely while the other production path is being used.

BRIEF DESCRIPTION OF THE DRAWINGS

The invention will be explained in more detail in the following with reference to preferred embodiments and to associated drawings. There are shown in the drawings:

FIG. 2: a side view of the diverter valve of FIG. 1 which shows a plan view of one of the melt generator connections;

FIG. 3: a side view of the diverter valve of FIG. 1 which shows a plan view of one of the pelletizer connections;

FIG. 4: a section along the line C-C in FIG. 3;

FIG. 5: a section along the line D-O in FIG. 2;

FIG. 6: a section along the line 8-8 in FIG. 2;

FIG. 7: a section along the line A-A in FIG. 3;

FIGS. 8 to FIG. 13: side views and sectional views of the diverter valve of FIG. 1 corresponding to the FIGS. 2 to 7, with the diverter valve in FIGS. 8 to 13 not being shown with its valve gate in the production position, but is shown in the bypass position or start-up position in which the melt is not yet being directed to the pelletizer connections, but to the floor;

FIG. 16: a section of the diverter valve of FIG. 14 similar to FIG. 15, but with the valve gate being shown in a first production position in which the melt generator connection is connected to a first pelletizer connection;

FIG. 17: a section of the diverter valve of FIG. 14 similar to the FIGS. 15 and 16, but with the valve gate being shown in a second production position in which the melt generator connection is in communication with the second pelletizer connection;

FIG. 19: a sectionally enlarged representation of the diverter valve of the pelletizer apparatus of FIG. 18, with the start-up position of the valve being shown in the view a) and one of the two production positions of the diverter valve being showing in the representation b);

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
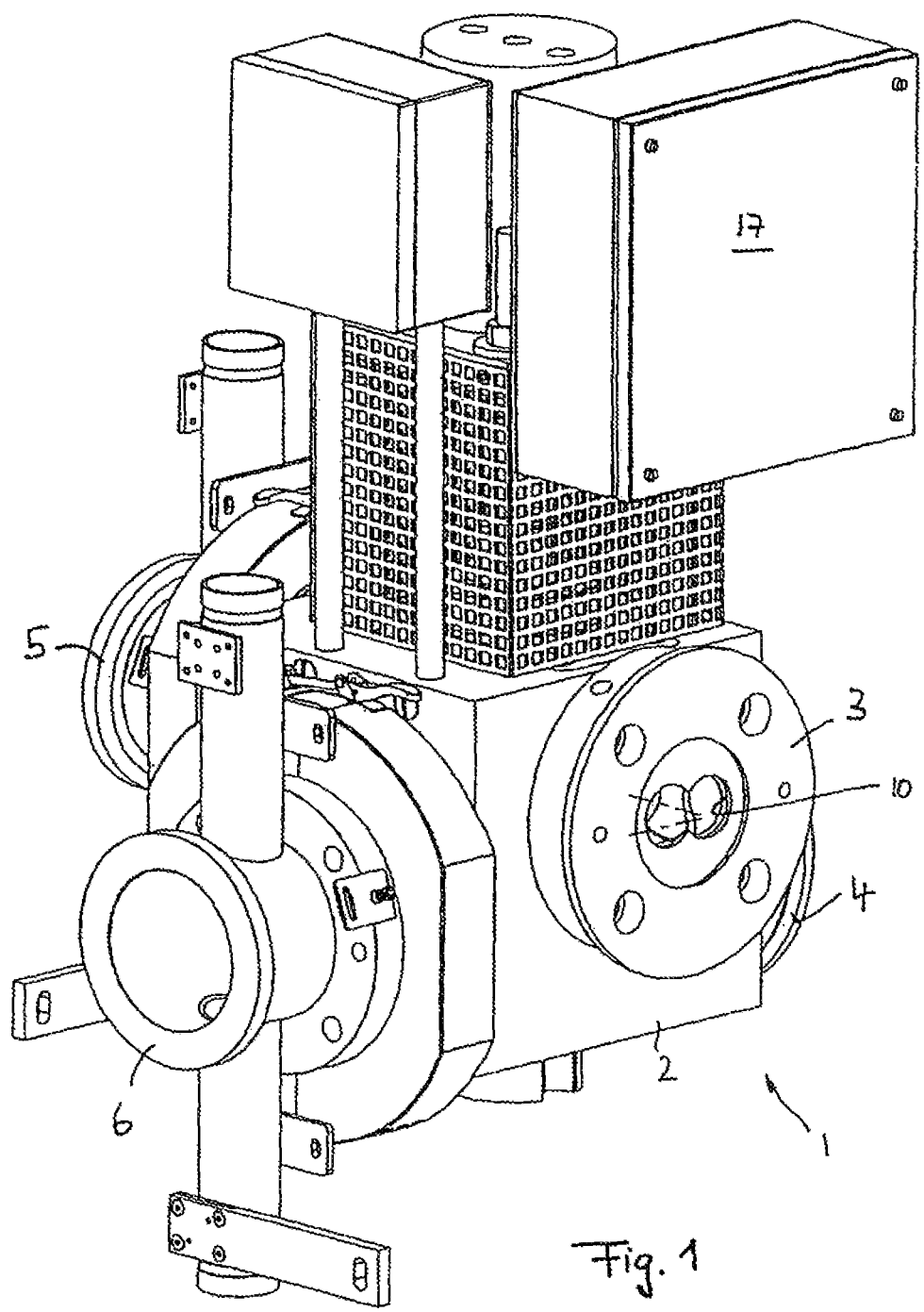
FIG. 1: a perspective overall view of a diverter valve having two melt generator connections with corresponding inlet openings and two pelletizer connections with corresponding outlet openings.
Figure 11:
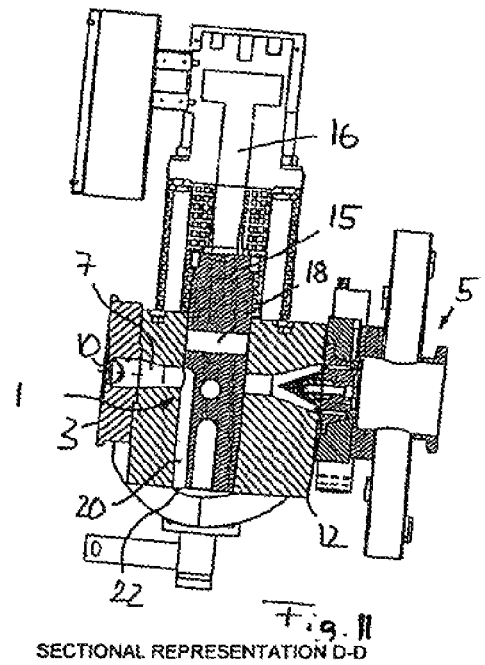
Figure 12:
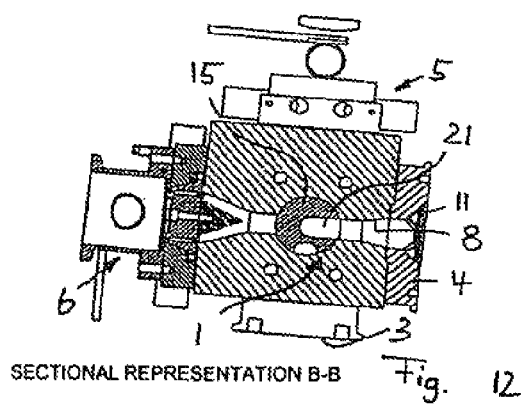
Figure 13:
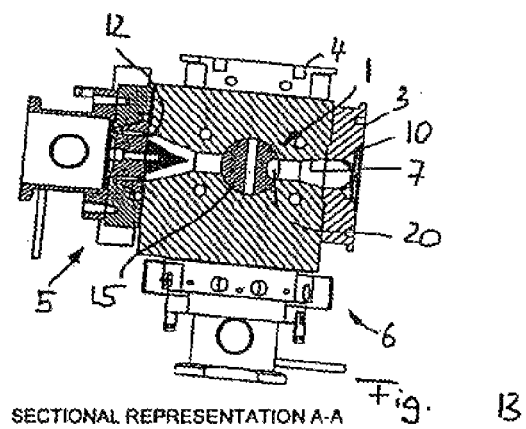

The diverter valve 1 shown in FIG. 1 has a valve housing 2 at whose outer side a first melt generator connection 3 as well as a second melt generator connection 4 as well as furthermore a first pelletizer connection 5 and a second pelletizer connection 6 are provided. As FIG. 1 shows, the connections 3 to 6 are distributed over the periphery of the valve housing 2 and are arranged on respective oppositely disposed sides. The first melt generator connection 3 is disposed opposite the first pelletizer connection 5, whereas the second melt generator connection 4 is disposed opposite the second pelletizer connection 6.

The melt generator connection and the pelletizer connection can be brought into flow communication with one another. For this purpose, a first melt passage 7 (see FIGS. 1 and 5) is provided in the interior of the valve housing 2 through which the first melt generator connection 3 can be connected to the first pelletizer connection 5 and a second melt passage 8 (see FIGS. 4 and 6) is provided through which the second melt generator connection 4 can be connected to the second pelletizer connection 6. The melt passages 7 and 8 communicate in this connection with corresponding inlet openings 10 and 11 at the two melt generator connections 3 and 4 and to corresponding outlet openings 12 and 13 at the pelletizer connections 5 and 6.

The two melt passages 7 and 8 having the respective associated first melt generator connection and pelletizer connection 3 and 5 or the second melt generator connection and pelletizer connection 4 and 6 form mutually independent and separately operable production directions. The flow path for the melt through the one melt passage has no overlap with the flow path through the second melt passage. The two melt passages are only linked to one another to the extent that a common diverter valve is provided for both melt passages, as will still be explained. As FIGS. 1, 2 and 3 show, the matching first melt generator connection and pelletizer connection 3 and 5 together with the first melt passage 7 connecting them is vertically offset with respect to the likewise matching second melt generator connection and pelletizer connection 4 and 6 and the associated second melt passage 8. The first melt passage 7 between the first melt generator connection and pelletizer connection 3 and 5 extends above the second melt passage 8 between the second melt generator connection and pelletizer connection 4 and 6 and beyond them. It is understood that other arrangements are also possible here, e.g. the four connections 3-6 could generally be arranged at the same vertical level and the melt passages could, for example, extend beyond one another by an arcuate extension. The embodiments shown in the Figures are, however, characterized by their simple manufacturing capability based on the straight extent of the melt passages 7 and 8.

In the interior of the valve housing or valve body 2 (see FIGS. 4 and 5), a valve gate 15 is provided which is associated with the two melt passages 7 and 8 and can divert the melt flow in each of the melt passages 7 and 8 to a bypass opening for the start-up process. The valve gate 15 in the drawn embodiment comprises a substantially cylindrical body which is longitudinally displaceably received in a valve bore which extends vertically in the drawn embodiment and which extends transversely to the longitudinal axes of the melt passages 7 and 8. It is understood that the valve gate 15 could optionally also be configured as a rotary slide which is not actuated by axial longitudinal displacement, but by rotation around its longitudinal axis. Further valve principles are possible.

As FIGS. 1 to 5 show, the valve gate 15 is actuated by a valve actuator 16 which is arranged on the upper side of the valve housing 2 and is controlled by an electronic control unit 17. The valve actuator 16 can realize different operative principles, e.g. work electromagnetically or hydraulically or pneumatically. It effects the adjustment of the valve gate 15 between its production position and its start-up position or bypass position.

In the production position shown in FIGS. 2 to 7, the valve gate 15 switches through the two melt passages 7 and 8, i.e. the melt flow entering at the respective inlet openings 10 and 11 at the melt generator connections 3 and 4 is directed through the melt passages 7 and 8 beyond the valve gate 15 to the associated outlet openings 12 and 13 of the pelletizer connections 5 and 6. As FIGS. 4 to 7 show, the melt passages 7 and 8 each open onto the valve bore into which the valve gate 15 is inserted. Two production passages 18 and 19 are provided in the valve gate 15 and continue the melt passages 7 and 8 so-to-say in the position of the valve gate 15 shown in FIGS. 5 to 7.

If the valve gate 15 is moved with the help of the valve actuator 16 from the production position shown in FIGS. 2 to 7 into the start-up position shown in FIGS. 8 to 13, the valve gate 15 blocks the communication of the inlet openings 10 and 11 at the melt generator connections 3 and 4 with the outlet openings 12 and 13 at the pelletizer connections 5 and 6. The valve gate 15 diverts the melt flow entering at the inlet opening 10 and/or at the inlet opening 11 to a bypass opening so that the melt flow is directed to the floor on start-up. For this purpose, the valve gate 15 has two bypass passages 20 and 21 which are in flow communication with the melt passages 7 and 8, more precisely with their sections originating from the inlet openings 10 and 11 in the start-up position of the valve gate 15 shown in FIGS. 8 to 13 and so-to-say pick up the melt flow coming from there. At the other end, the two bypass passages 20 and 21 open into respective bypass outlet openings 22 and 35 in the end face of the valve gate 15 whose lower end face is in communication with the outer side of the valve housing 2.

In particular, two use possibilities present themselves for the diverter valve 1 shown in FIGS. 1 to 13. On the one hand, the diverter valve 1 can be used with in each case only one of the melt generator connections 3 and 4 and with only one of the pelletizer connections 5 and 6 at a defined point in time. That is, only one of the two production directions is used, whereas the other production direction, i.e. the other pair of melt generator and pelletizer connections remains unused and is kept so-to-say on stand-by. If the correspondingly running production process should be interrupted and a new production process started, the diverter valve is released from the respective melt generator and pelletizer via quick-closing couplings. The valve is rotated through 90° and then installed at the melt generator and at the pelletizer for the production process to be started using the previously unused melt generator connection and pelletizer connection. This new production process can be started in a manner known per se in that first the valve gate 15 is moved to its start-up position in accordance with FIGS. 8 to 13 so that the melt drops to the floor during the start-up procedure. Once the plant has been started up, the valve gate 15 is moved into its production position in accordance with FIGS. 2 to 7 so that the new melt flow is guided from the pelletizer beyond the valve gate to the connected pelletizer. The changeover times are hereby minimized. Time is above all saved for the cleaning of the diverter valve. The cleaning of the previously used production passage can take place after the valve with the fresh production passage has been connected and the new production process is already running. It is moreover advantageous that the diverter valve is already at least approximately at operating temperature since it was still heated from the previously interrupted production process.

On the other hand, the diverter valve 1 described above also provides the option of using both production passages simultaneously, i.e. of connecting both melt generator connections 3 and 4 to one or more melt generators and equally to connect the two pelletizer connections 5 and 6 to two pelletizers simultaneously. The previously described configuration of the valve gate 15 ensures in this process that initially both production passages are switched to the start-up position, i.e. both processes can be started up. A soon as both processes have started up, the valve gate 15 can be switched over to start both production processes.

Independently of whether the production processes are operated sequentially or simultaneously, the diverter valve 1 advantageously provides the opportunity of operating two production processes which are the same or also which are completely different. For instance, pelletizing processes which are the same in each case such as extrusion pelletizing or underwater pelletization can be operated via the first melt generator connection and pelletizer connection 3 and 5 and via the second melt generator connection and pelletizer connection 4 and 6, but also different pelletizing processes can be operated, i.e. extrusion processing on the one and underwater pelletization on the other. In this respect, the respectively required nozzle plates can be used which can either have the same section geometry and number of bores, the same section geometry and a different number of bores, a different section geometry and the same number of bores or both a different section geometry and a different number of bores or which can also realize one of these possible combinations in different constructional sizes.

The second embodiment of the diverter valve 1 in accordance with FIGS. 14 to 17 substantially differs from the previously described first embodiment in that the diverter valve has, instead of two melt generator connections, only one melt generator connection 3 which can be selectively connected to the first pelletizer connection 5 or the second pelletizer connection 6 or which can be connected to the bypass opening in the start-up position of the valve. To the extent that the diverter valve 1 in accordance with FIGS. 14 to 17 agrees with the previously described embodiment, the same components are provided with the same reference numerals and reference is made to this extent to the previous description.

Figure 14:
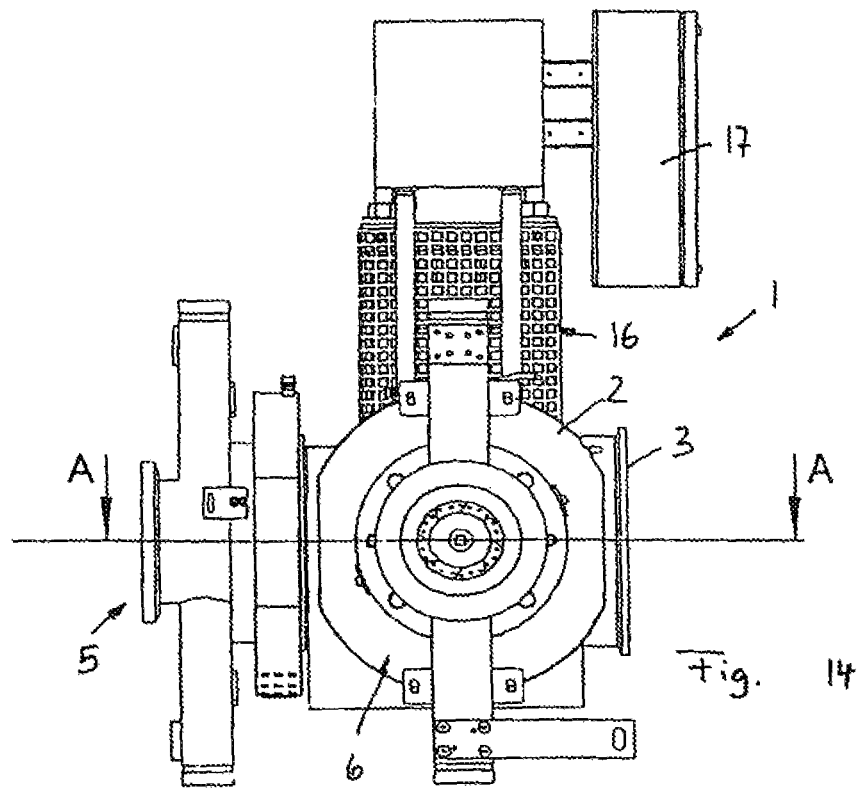
FIG. 14: a side view of a diverter valve having two pelletizer connections, but only one melt generator connection, with the side view showing a plan view of one of the two pelletizer connections.
Figure 15:
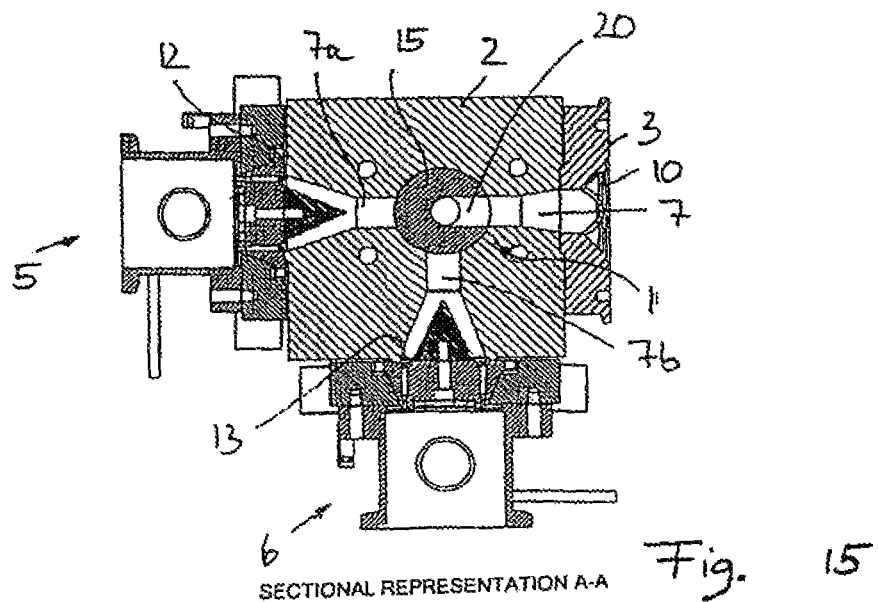
FIG. 15: a section along the line A-A in FIG. 14 which shows the valve gate in its bypass position in which the melt generator connection is connected to neither of the two pelletizer connections, but to a bypass opening.

As FIGS. 14 and 15 show, in this embodiment, the melt generator connection 3 and the two pelletizer connections 5 and 6 are arranged at the same level (see FIG. 14) and are in communication with one respective melt passage 7, 7a and 7b which extend in each case radially inwardly from the inlet opening 10 or the outlet openings 12 and 13 and all three open in the valve bore in which the valve gate 15 is received. The valve gate 15 of the diverter valve 1 is axially adjustable in the previously described manner. It includes two production passages 18 and 19 (see FIGS. 16 and 17). In the first production position of the valve gate 15, which FIG. 16 shows, the valve gate 15 switches the inlet opening 10 of the melt generator connection 3 through to the outlet opening 12 of the first pelletizer connection 5. The first production passage 18 continues the melt passage 7 coming from the melt generator connection 3 to the section 7a of the melt passage in communication with the first pelletizer connection 5 so that the melt flow entering via the inlet opening 10 moves to the pelletizer installed at the first pelletizer connection 5.

If the valve gate 15 moves into its second production position, which FIG. 17 shows, the valve gate 15 switches the first melt generator connection 3 to the second pelletizer connection 6. The second production passage 19 in the valve gate 15 continues the melt passage 7 coming from the inlet opening 10 to the section 7b of the melt passage in communication with the second pelletizer connection 6 so that the melt flow entering via the inlet opening 10 can move to the pelletizer which is connected to the second pelletizer connection 6.

Furthermore, the valve gate 15 can be moved into a start-up position or a bypass position, which FIG. 15 shows. In this position, the valve gate 15 blocks both pelletizer connections 5 and 6 and directs the melt flow entering via the inlet opening 10 via the bypass passage 20 formed in the valve gate 15 to a bypass opening which is provided at the end face at the lower end of the valve gate 15. The melt can be directed to the floor in the previously described manner via this bypass opening on the start-up of the plant.

In this second embodiment of the diverter valve 1, in each case only one of the two outlet openings 12 and 13 are therefore served via a common inlet at a defined point in time. The polymer melt entering via the inlet opening 10 is diverted to one of the pelletizer connections, whereas the respective other is in stand-by and is therefore not used. The switchover can take place in a matter of seconds by actuation of the valve gate 15.

In simple processes, the valve gate 15 could also only have its two production positions and could dispense with the bypass position and the corresponding bypass passage 20. In this process, the so-called start-up product could then be reshaped to pellets on the then smaller pelletizer, whereby the otherwise usually large start-up positions would be completely dispensed with.

In particular the second embodiment of the diverter valve 1 can be used where complex plant should be operated with units which are as small as possible and in very restricted space. The switchover possibility during operation makes it possible to avoid interruptions to a very large extent or to realize a very wide throughput processing window on one production machine by a clever selection of the two pelletizer heads.

Two pelletizing processes which are the same, that is, for example, extrusion pelletization at both pelletizer connections 5 and 6 or also underwater pelletization processes at both connections, can also be operated in this embodiment of the diverter gate 1 via the two pelletizer connections 5 and 6. However, different pelletization processes can also be operated, e.g. extrusion pelletization at the one pelletizer connection and an underwater pelletization at the other pelletizer connection. In any case, nozzle plates can be used at the two pelletizer connections 5 and 6 which have the same section geometry and number of bores, the same section geometry with a different number of bores, a different section geometry with the same number of bores or a different number of bores. It is understood that nozzle plates in different construction sizes can also be used with each of these possibilities.

Interesting use possibilities in particular result when different pelletizer construction sizes are used at the two pelletizer connections 5 and 6. The volume flow window achievable with a machine can thus e.g. be considerably increased by different nozzle plates. The loss quantity per start-up process can moreover be considerably reduced, whereby less material loss arises overall which then has to be disposed of or treated, on the one hand, and a faster start is achieved, on the other hand, which means less personnel and less handling overall.

Figure 18:
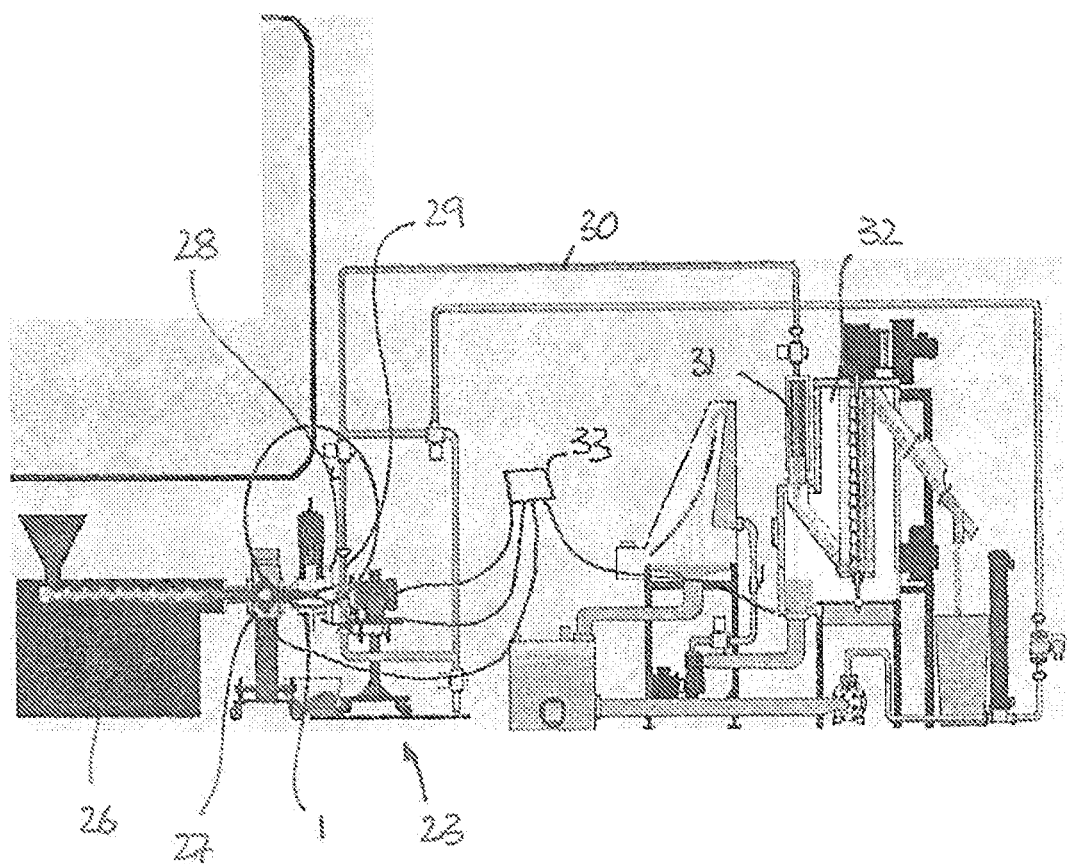
FIG. 18: a schematic representation of an underwater pelletizing apparatus having a diverter valve in accordance with FIGS. 14 to 17 to which two pelletizing heads having different throughput capacities are connected.

The described diverter valve 1 in accordance with FIGS. 14 to 17 is used in a particularly advantageous manner in an underwater apparatus 23 as is shown in FIG. 18, with pelletizer heads 24 and 25 having different throughput capacities advantageously being connected to the two pelletizer connections 5 and 6. As FIG. 18 shows, the melt supplied horizontally via an extruder 26 and/or via a gear pump 27 is pressed via the diverter valve 1 through the radially arranged bores of the nozzle plate 28 of one of the two pelletizing heads 24 or 25. The strands are cut directly to pellets on discharge from the said nozzle plate 28 in the completely flooded cutting chamber and are transported away by the water flow 29, with the melt solidifying abruptly due to the high temperature difference to the process water so that the spherical shape of the pellets characteristic for underwater pelletization arises in dependence on the viscosity. As FIG. 18 illustrates, the pellet/water mixture exiting the cutting chamber of the respective pelletizing head 24 or 25 is supplied by means of a transport line 30 to an agglomerate collector 31 which is positioned upstream of a centrifugal drier 32.

When the plant is started up, the valve gate 15 of the diverter valve 1, as first shown in FIG. 19a, is moved into its bypass position so that the melt flow is diverted to the floor. The melt volume flow is continuously increased by a central control apparatus 33 by a corresponding control of the extruder 26 and/or of the gear pump 27 until a lower capacity limit of the first pelletizing head 24 having the smaller throughput capacity is reached. As already mentioned, it is in particular necessary with polymers sensitive to freezing, e.g. with products having a high crystallite melting point, to start and to operate at a minimum throughput of, for example, more than 10 kg/h per nozzle bore. It is also necessary to ramp up apparatus components, including the diverter valve 1, to a predetermined minimum temperature which can be material dependent.

Figure 20:
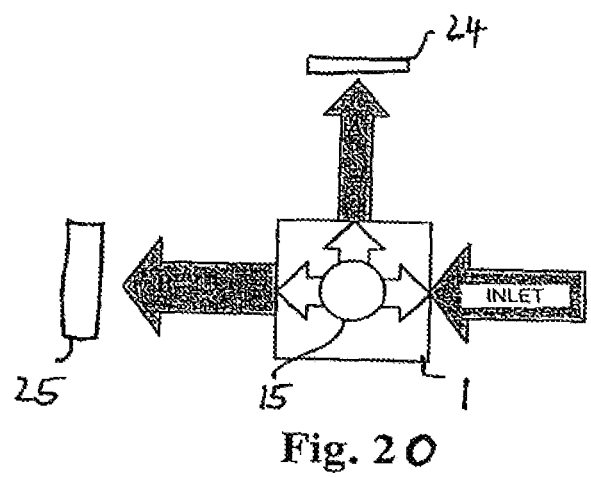
FIG. 20: a schematic representation of the melt flows and pelletization capacities settable by the diverter valve from the preceding Figures.
Figure 21:
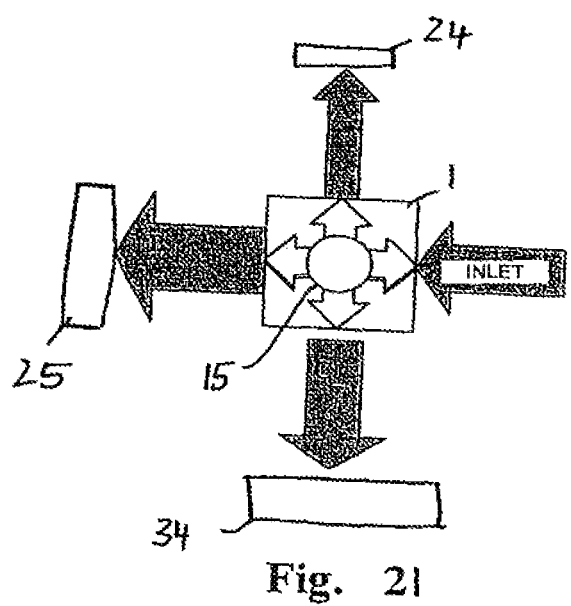
FIG. 21: a schematic representation of a diverter valve in accordance with an alternative embodiment of the invention in which three pelletizing heads having respectively different throughput capacities are connected so that the melt entering into the inlet of the diverter valve can be selectively directed to one of the three pelletizing heads or to a bypass line.

As soon as the lower capacity limit of the named first pelletizing head 24 has been reached and/or further operating parameters characteristic for the plant or characteristic for the material have been reached, the central control apparatus 33 (see FIG. 18) controls the diverter valve 1 such that the valve gate 15 is moved into its first production position in which the melt is directed to the first pelletizing head 24. FIGS. 20 and 21 illustrate this smaller melt volume flow on the first pelletizing head 24 by the arrow A.

As soon as the pelletization through the first pelletizing head 24 has started up, the melt volume flow is further increased until the lower capacity limit of the second pelletizing head 25 has been reached which is above the lower capacity limit of the first pelletizing head 24 and is advantageously approximately in the range of the upper capacity limit of the said first pelletizing head 24. The capacity ranges of the named two pelletizing heads 24 and 25 preferably adjoin one another seamlessly or a slight overlap can be provided. Once the melt volume flow has been ramped up to the said lower capacity limit of the second pelletizing head 25, the central control apparatus 33 controls the valve gate 15 into its second production position so that the volume flow is diverted from the first pelletizing head 24 to the second pelletizing head 25 in a matter of seconds. FIGS. 20 and 21 illustrate this larger melt volume flow on the second pelletizing head 25 by the arrow B. In addition, a third pelletizing head 34 having a different throughput capacity may receive the melt entering the inlet as represented by the arrow C.

Substantial increases in efficiency can be achieved and start-up losses can be avoided by the start-up of the pelletization process of the second, larger pelletizing head 25 with interposition of the pelletizing process via the first, smaller pelletizing head 24.

The economic advantage should be illustrated by the following examples:

EXAMPLE 1

A pelletization for PP compounds starting from a double screw extruder having e.g. 150 bores in the nozzle plate and an assumed volume flow window of 10 kg/h and bore up to 35 kg/h and bore normally processes between 1,500 kg/h and up to 5,250 kg/h. In this process, the cutting speed of the pelletizer is necessarily feedback tracked by the factor of 3.5; one starts at 1,500 kg/h and 1,030 l/min of a given blade combination and increases the blade speed in linear fashion to 3,600 l/min for 5,250 kg/h. The pellets generated in this manner then each have the same weight. If a 2nd pelletizing head were now installed at this given machine having, for example, 45 bores and the resulting capacity from 450-1,575 kg/h, the production window increases to approximately factor 12. The same machine could thus generate from 450-5,250 kg/h of high-quality pellets.

When the worst-case scenario is taken into account (approximately 3 minutes startup requirement up to the actual start with a minimum required throughput performance), this means for the above case:

With a standard diverter valve:

3 minutes×1,500 kg/h=75 kg material losses, per start-up process.

With a bidirectional diverter valve, this would mean:

3 minutes×450 kg/h=22.5 kg material losses, per start-up process.

There is in addition the fact that the same production machine which requires 3 minutes for the manufacture of 1,500 kg, will reach the 450 kg/h substantially faster. This can in turn reduce the start-up time to a third, which then means in sum:

54 seconds×450 kg/h=6.75 kg material losses, per start-up process.

As documented in this example, this option of the invention therefore opens up a reduction of the loss quantity per start-up process by a factor 11.11. For the production facility, this means that, on the one hand, less material loss arises which then has to be disposed of or treated and, on the other hand, a faster start is permitted, which means less personnel and less handling overall (plastics have to be sucked up and cooled on discharge from the diverter valve to the bottom=floor, which naturally directly influences the operating costs).

With only one product change per day and raw material prices of €1.20/kg, this means that €81.90 can be saved per day; this is an annual savings potential of €29,839.50 p.a.

EXAMPLE 2

A pelletization for PET starting from a reactor having e.g. 250 bores in the nozzle plate and an assumed volume flow window of 30 kg/h and bore up to 50 kg/h and bore normally processes between 7,500 kg/h and up to 12,500 kg/h. In this process, the cutting speed of the pelletizer is necessarily feedback tracked by the factor of 1.67; one starts at 7,500 kg/h and 1,796 l/min of a given blade combination and increases the blade speed in linear fashion to 3,000 l/min for 12,500 kg/h. The pellets generated in this manner then each have the same weight. If a $2^{nd}$ pelletizing head were now installed at this given machine having, for example, 150 bores and the resulting capacity from 4,500-7,500 kg/h, the production window increases to approximately factor 2.78. The same machine could thus generate from 4,500-12,500 kg/h of high-quality pellets.

When the worst-case scenario is taken into account (approximately 2 minutes startup requirement up to the actual start with a minimum required throughput performance), this means for the above case:

With a standard diverter valve:

2 minutes×7,500 kg/h=250 kg material losses, per start-up process.

With a bidirectional diverter valve, this would mean:

2 minutes×4,500 kg/h=150 kg material losses, per start-up process.

There is in addition the fact that the same production machine which requires 2 minutes for the manufacture of 7,500 kg, will reach the 4,500 kg/h substantially faster. This can in turn reduce the start-up time, which then means in sum:

72 seconds×4,500 kg/h=90 kg material losses, per start-up process.

As documented in this example, this option of the invention therefore opens up a reduction of the loss quantity per start-up process by a factor 2.78. For the production facility, this means that, on the one hand, less material loss arises which then has to be disposed of or treated and, on the other hand, a faster start is permitted, which means less personnel and less handling overall (plastics have to be sucked up and cooled on discharge from the diverter valve to the bottom=floor, which naturally directly influences the operating costs).

EXAMPLE 3

A pelletization for PET starting from a reactor having e.g. 250 bores in the nozzle plate and an assumed volume flow window of 30 kg/h and bore up to 50 kg/h and bore normally processes between 7,500 kg/h and up to 12,500 kg/h. In this process, the cutting speed of the pelletizer is necessarily feedback tracked by the factor of 1.67; one starts at 7,500 kg/h and 1,796 l/min of a given blade combination and increases the blade speed in linear fashion to 3,000 l/min for 12,500 kg/h. The pellets generated in this manner then each have the same weight. If a $2^{nd}$ pelletizing head were now installed at this given machine having, for example, 150 bores and the resulting capacity from 4,500-7,500 kg/h, the production window increases to approximately factor 2.78. The same machine could thus generate from 4,500-12,500 kg/h of high-quality pellets. If one were now to use the option of a multidirectional diverter valve and to install a further third nozzle plate/pelletizing head combination, as shown in FIG. 21, this has the consequence of a further reduction of the minimum start-up performance. If one e.g. takes a third nozzle with 90 bores, a throughput performance range from 2,700 kg/h up to 4,500 kg/h is obtained. The pelletizing device is thus ultimately available in the range from 2,700-12,500 kg/h. The production window thus increases to approximately factor 4.63.

Analogously to the aforesaid, it applies to this case: when the worst-case scenario is taken into account (approximately 2 minutes start-up requirement up to the actual start with a minimum required throughput performance), this means for the above case:

With a standard diverter valve:

2 minutes×7,500 kg/h=250 kg material losses, per start-up process.

With a bidirectional diverter valve, this would mean:

2 minutes×2,700 kg/h=90 kg material losses, per start-up process.

There is in addition the fact that the same production machine which requires 2 minutes for the manufacture of 7,500 kg, will reach the 2,700 kg/h substantially faster. This can in turn reduce the start-'up time by half, which then means in sum:

43.2 seconds×2,700 kg/h=32.4 kg material losses, per start-up process.

As documented in this example, this option of the invention therefore opens up a reduction of the loss quantity per start-up process by a factor 7.72. For the production facility, this means that, on the one hand, less material loss arises which then has to be disposed of or treated and, on the other hand, a faster start is permitted, which means less personnel and less handling overall (plastics have to be sucked up and cooled on discharge from the diverter valve to the bottom=floor, which naturally directly influences the operating costs).

For a fully continuous pelletization, this means that a total of €216.12 per week can be saved with one product change per week and raw material prices of €1.20/kg. this is an annual savings potential of €13,578.24 p.a.

For a discontinuous pelletization, this means that with only one product change per day (=50 tonnes preparation with 20 h reaction time and 4 h pelletization discharge time) and raw material prices of €1.20/kg, a total of €261.12/day can be saved. This is an annual savings potential of €95,308.80 p.a.

Even if the use of the diverter valve 1 in an underwater pelletization apparatus is described above, corresponding advantages can also be achieved with other pelletizing processes, for instance e.g. with extrusion pelletization or water ring pelletization, with optionally also the pelletizing heads with the different throughput capacities being able to use such different pelletizing processes.

The product flows A and B (cf. FIG. 20) can differ for the option in the following application examples:

Both flows each use the same pelletization method (extrusion pelletization/extrusion pelletization; water ring pelletization/ water ring pelletization; underwater pelletization/underwater pelletization) while using the respectively required nozzle plates which are either of the same geometry in section and of the same number of bores or are of the same geometry in section and of a different number of bores or are of a different geometry in section and of the same number of bores, of are of different geometry in section or of the same number of bores or have one of the preceding options, but can be associated with a respectively different construction size.

Both flows each use a different pelletization process (extrusion pelletization/water ring pelletization or underwater pelletization; water ring pelletization/extrusion pelletization or underwater pelletization; underwater pelletization/water ring pelletization or extrusion pelletization) while using the respectively required nozzle plates which are either of the same geometry in section and of the same number of bores or are of the same geometry in section and of a different number of bores or are of a different geometry in section and of the same number of bores, of are of different geometry in section or of the same number of bores or have one of the preceding options, but can be associated with a respectively different construction size.

The preferred process of them all is the underwater pelletization/underwater pelletization use variant since in this process the processing window which is largest overall is made available at the production side.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A pelletizing apparatus for the pelletizing of plastics and/or polymers comprising:
    a diverter valve having at least one melt generator connection, a bypass position, at least two pelletizer connections and a valve gate for the selective connection of the melt generator connection to at least one of the pelletizer connections;
    a first pelletizing head and a second pelletizing head being connected to the at least two pelletizer connections, respectively, said first and second pelletizing heads having different throughput capacities;
    a melt generator for generating a melt having a variable melt volume flow being connected to the melt generator connection;
    a central control apparatus configured to switch the connection of the melt generator connection of the diverter valve between said first and second pelletizing heads in dependence on the melt volume flow of the melt generator; and
    a detection mechanism for detection of the melt volume flow directed into the diverter valve, said central control apparatus automatically switching over the diverter valve in dependence on a signal of the detection mechanism.

2. The pelletizer apparatus in accordance with claim 1, wherein the central control apparatus has a control mechanism which switches the diverter valve to the first pelletizing head having a smaller throughput capacity when the melt volume flow is below a lower capacity limit of the second pelletizing head having a larger throughput capacity and/or above a lower capacity limit of the first pelletizing head; and
    said diverter valve configured to switch to the second pelletizing head when the melt volume flow is above the lower capacity limit of the second pelletizing head and/or below a lower capacity limit of a third pelletizing head having an even larger throughput capacity.

3. The pelletizer apparatus in accordance with claim 1, wherein the central control apparatus has a start-up control mechanism which, in a first step, moves the valve gate of the diverter valve into a first operating position in which the melt is directed to the first pelletizing head having a minimum throughput capacity and operates the melt generator to a volume flow which is in the range of the lower capacity limit of the first pelletizing head which then, in a second step, increases the volume flow of the melt generator up to an upper capacity limit of the first pelletizing head and/or to a lower capacity limit of the second pelletizing head having a larger throughput capacity, and which finally, in a third step, operates the valve gate of the diverter valve into a second operating position in which the melt is directed to the second pelletizing head.

4. The pelletizer apparatus in accordance with claim 3, wherein the start-up control mechanism is configured such that, before said first step, the valve gate is kept in a bypass position in which the melt directed into the diverter valve is directed past all pelletizing heads until the melt volume flow is operated in the range of the lower capacity limit of the first pelletizing head having a minimum throughput capacity.

5. The pelletizer apparatus in accordance with claim 1, wherein said first and second pelletizing heads have mutually complementary throughput capacity ranges.

6. The pelletizer apparatus in accordance with claim 5, wherein said first and second pelletizing heads have throughput capacity ranges adjoining one another seamlessly.

7. The pelletizer apparatus in accordance with claim 1, wherein at least one of the pelletizing heads forms an underwater pelletizing head.

8. The pelletizer apparatus in accordance with claim 7, wherein all the pelletizing heads form underwater pelletizing heads.

9. The pelletizer apparatus in accordance with claim 1, wherein at least one of the pelletizing heads forms an extrusion pelletizing head and/or a water ring pelletizing head.

10. The pelletizer apparatus in accordance with claim 1, wherein at least one of the pelletizing heads forms an underwater pelletizing head and at least one other of the pelletizing heads forms an extrusion pelletizing head and/or a water ring pelletizing head.

11. The pelletizer apparatus in accordance with claim 1, wherein the diverter valve is provided with a melt generator connection, a first pelletizer connection, a melt passage for the communication of the melt generator connection with the first pelletizer connection as well as a second pelletizer connection which can likewise be connected to the melt passage, with a valve gate being provided in the melt passage which, in a first production position, connects the melt generator connection to the first pelletizer connection and, in a second production position, connects the melt generator connection to the second pelletizer connection.

12. The pelletizer apparatus in accordance with claim 11, wherein the valve gate is provided in the melt passage which releases the connection of the melt generator connection to the first and/or second pelletizer connections in a production position and blocks the first and/or second pelletizer connections from communication with the melt generator connection and connects the melt generator connection to a bypass opening in a start-up position.

13. The pelletizer apparatus in accordance with claim 12, wherein the valve gate is actuated by a valve actuator.

14. The pelletizer apparatus in accordance with claim 11, wherein a third pelletizer connection is provided which can be connected to the melt passage and the valve gate is configured such that said switching gate connects the melt generator connection to the third pelletizer connection in a third production position.

15. The pelletizer apparatus in accordance with claim 13, wherein the valve gate is formed by a cylindrical valve body which has a plurality of separate production passages and is longitudinally displaceably supported in a valve recess.

16. The pelletizer apparatus in accordance with claim 15, wherein the valve body has at least one bypass passage.

17. The pelletizer apparatus in accordance with claim 15, wherein the valve body is movably supported in a direction transverse to the connections between the melt generator connection and the pelletizer connection.

18. The pelletizer apparatus in accordance with claim 1, wherein the melt generator connections and the pelletizer connections are configured such that they can be connected to the melt generator or to the respective pelletizer head by couplings.

19. The pelletizer apparatus in accordance with claim 1, further comprising sensors for the detection of a melt viscosity, a mass temperature of the melt, a mass pressure of the melt, a volume flow of the melt, a degassing state, a pellet size and/or a pellet shape are provided, and wherein the central control apparatus switches the diverter valve in dependence on at least one signal of the said detection mechanism.

20. A method for the pelletization of plastics and/or polymers in which a melt coming from a melt generator is supplied via a diverter valve having a melt generator connection and at least two pelletizing connections connected to at least a first pelletizing head and a second pelletizing head, respectively through which the melt is pelletized, said two pelletizing heads having different throughput capacities, said method comprising the steps of:
 generating a melt with a melt generator and directing the melt to melt generation connection of the diverter valve;
 sequentially using said first and second pelletizing heads having different throughput capacities for the start-up of the pelletizing process, said melt being first supplied to said first pelletizing head having a smaller throughput capacity;
 increasing the melt volume flow;
 detecting the melt volume flow of the melt generator into the diverter valve using a detection mechanism; and
 switching the diverter valve over to divert the melt to the second pelletizing head having a larger throughput capacity using a central control apparatus configured to automatically switch the melt generator connection of the diverter valve between said first and second pelletizing heads in dependence on a signal from the detection mechanism.

21. The method in accordance with claim 20, further comprising increasing the volume flow within the throughput capacity limits of the first pelletizing head before the switchover of the diverter valve to the second pelletizing head.

22. The method in accordance with claim 20, wherein the melt volume flow is first maintained in the range of a lower capacity limit of the first pelletizing head and is then increased up to the upper capacity limit of the first pelletizing head and/or up to the lower capacity limit of the second pelletizing head.

* * * * *